U. L. Leete,

Draughting Garments.

No. 4,226. Reissued Jan. 3. 1871.

Witnesses:
F. A. Lehmann
T. S. Mercer

Inventor:
Absalu G. Leete

N. PETERS, PHOTO-LITHOGRAPHER, WASHINGTON, D. C.

United States Patent Office.

URSULA LOUISE LEETE, OF NEW HAVEN, CONNECTICUT.

Letters Patent No. 107,068, dated September 6, 1870; reissue No. 4,226, dated January 3, 1871.

DIVISION B.

IMPROVEMENT IN INSTRUMENTS FOR DRAUGHTING GARMENTS.

The Schedule referred to in these Letters Patent and making part of the same.

*To all whom it may concern:*

Be it known that I, URSULA LOUISE LEETE, of New Haven, State of Connecticut, have invented certain new and useful Improvements in Instruments for Draughting Garments, of which the following is a specification.

*Nature and Objects of the Invention.*

My invention consists in a device for laying out the side pieces of a waist, as will hereafter be more fully set forth and described.

*Description of the Accompanying Drawing.*

Figure 1:
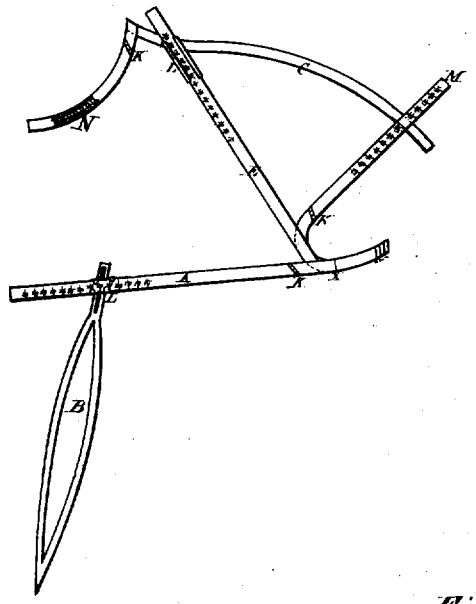

Figure 1 is a view of the instrument for laying out the front of upper garments.

Figure 2:
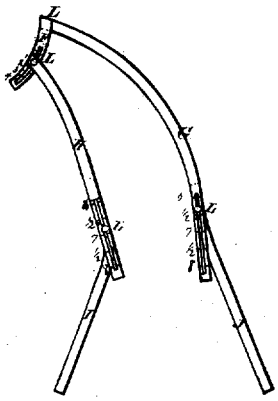

Figure 2, a view of the instrument for laying out the side piece and its frill or skirt.

Figure 3:
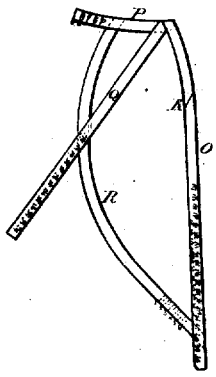

Figure 3, a view of the instrument for draughting a back.

*General Description.*

A is the main or chest-rule.

M is the arm-size rule.

E is a supporting-rule, upon which slides the shoulder-bar or rule C.

To the lower end of this shoulder-rule is attached the neck-rule N.

The shoulder-rule C is pivoted to a slide, which moves upon the rule E, by which means it is adjusted to its proper position distant from the main rule A, and relatively to the arm-size rule M.

B is a dart, which moves on pivots projecting from slides L, which slides move on the main rule A.

O, fig. 3, is a main rule, (shoulder-rule,) and has attached to its upper end the curved arm-rule P, and from the junction of these two, equi-distant therefrom, depends a short bar, Q, to which is pivoted the back-form or rule R.

This back-form vibrates to any position on the main rule O.

In fig. 2, G is the main rule, and has attached to its upper end the curved arm-rule F.

To this rule F is attached, by means of a pivot sliding in a slot, a rule, H.

To these rules G H, at their lower ends, the frill or skirt-rules J I are attached so as to swing on pivots vertically adjustable in suitable slots.

Each of the rules F, G, and H, have graduated scales marked along their slots, as shown in fig. 2.

*Operation.—To Draught for a Basque.*

First draw a line two inches from the edge of cloth to work from. Set the shoulder-gauge to figure 22, and place corresponding figures of neck-rule and chest-rule upon the line drawn to work from. Place upon chest-rule the dart for basque. Mark for darts. Mark arm-size from figure 22 to figure 1. Move shoulder-rule to fig. 22 on arm-size, and mark for neck and shoulder. Measure from X, arm-pit, seven inches, length of waist. From the line to work from, draw a line ten inches in length at waist-band, showing width of waist. Place the curved corner of inch-rule at end of line, arm-size, and side of rule at end of line, width of waist, and draw the curved line, side seam. Extend the line seven inches below the waist-band. Slant the line below the waist two inches at the end of the line. Extend the straight line to work from six inches below the waist. With rule, scale of figures for waist measure, get the shape of bottom of frill.

*To Draught Back of Basque.*

With inch-rule, double scale of figures, place figure 22, inside row, at upper corner folded edge of cloth, and figure 22, short bar, at folded edge. Draw a line from 0 on arm-size, around outside shoulder-rule to figure 22, outside row of figures. Make a dot. Draw a line, showing width of neck. With inch-rule measure from end of arm-size seven and a half inches for length of waist. Place back-form, letter R, at end of line arm-size, and bring side of rule within two inches of folded edge of cloth at waist-band, showing width, length, and shape of back. Draw a line from waist-band eight inches in length, and slant four inches from folded cloth at bottom of frill. Make the frill seven inches in length at center of back or folded cloth.

*To Draught for Side Piece.*

Place the pivot in slot at No. 1, arm-size, and in straight slot at No. 7, and in curved slot at 7½. Place the two rules with pivots three inches apart. At Nos. 7 and 7½ mark around outside of the rule for side piece. Mark down seven inches on frill in straight slot and eight inches on frill in curved slot. Place the frill-pieces ten inches apart at the bottom, and draw a straight line outside the pieces for length and width of frill. Get shape at bottom with rule-scale of figures.

Having thus described my invention,

What I claim as new, and desire to secure by Letters Patent, is—

1. The combination of the main rule G, arm-rule F, pivoted rule H, and pivoted sliding rules I J, substantially as shown and described.

2. In combination with the above, the main-rule A, arm-rule M, supporting-rule E, shoulder-bar C, dart B, main rule O, short bar Q, back-form R, and arm-rule P, when all are combined to operate substantially as shown and described.

In testimony that I claim the foregoing I hereby affix my signature.

U. L. LEETE.

Witnesses:
F. A. LEHMANN,
THOS. S. MERCER.